Nov. 19, 1963    L. S. SCHNEPEL    3,111,146
MOBILE SAWMILL UNIT
Filed Nov. 12, 1959    6 Sheets-Sheet 6
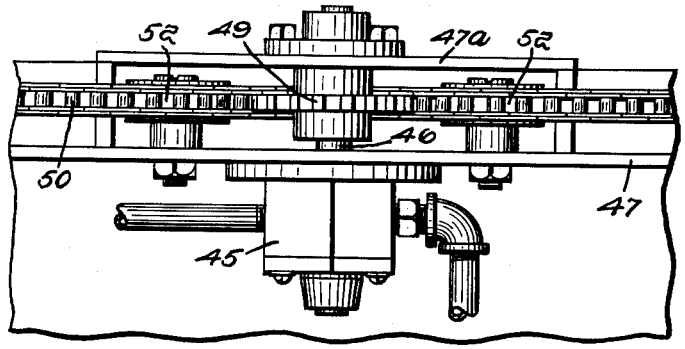
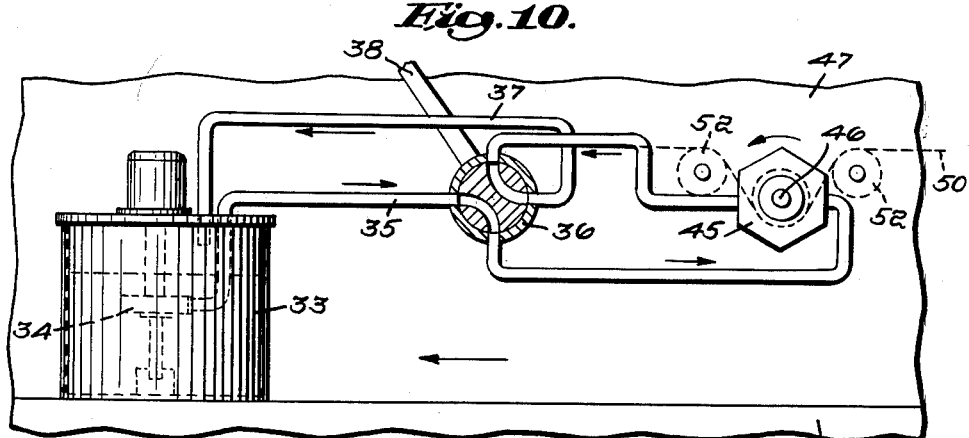
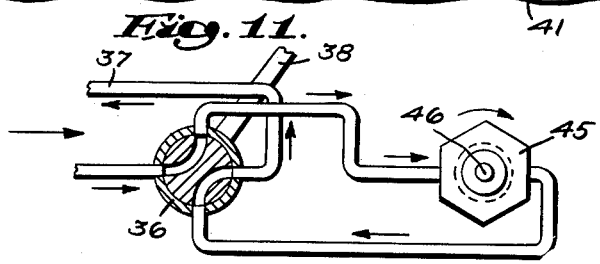
Inventor:
Lawrence S. Schnepel,
by Emery, Booth, Townsend, Miller & Weidner
Attys

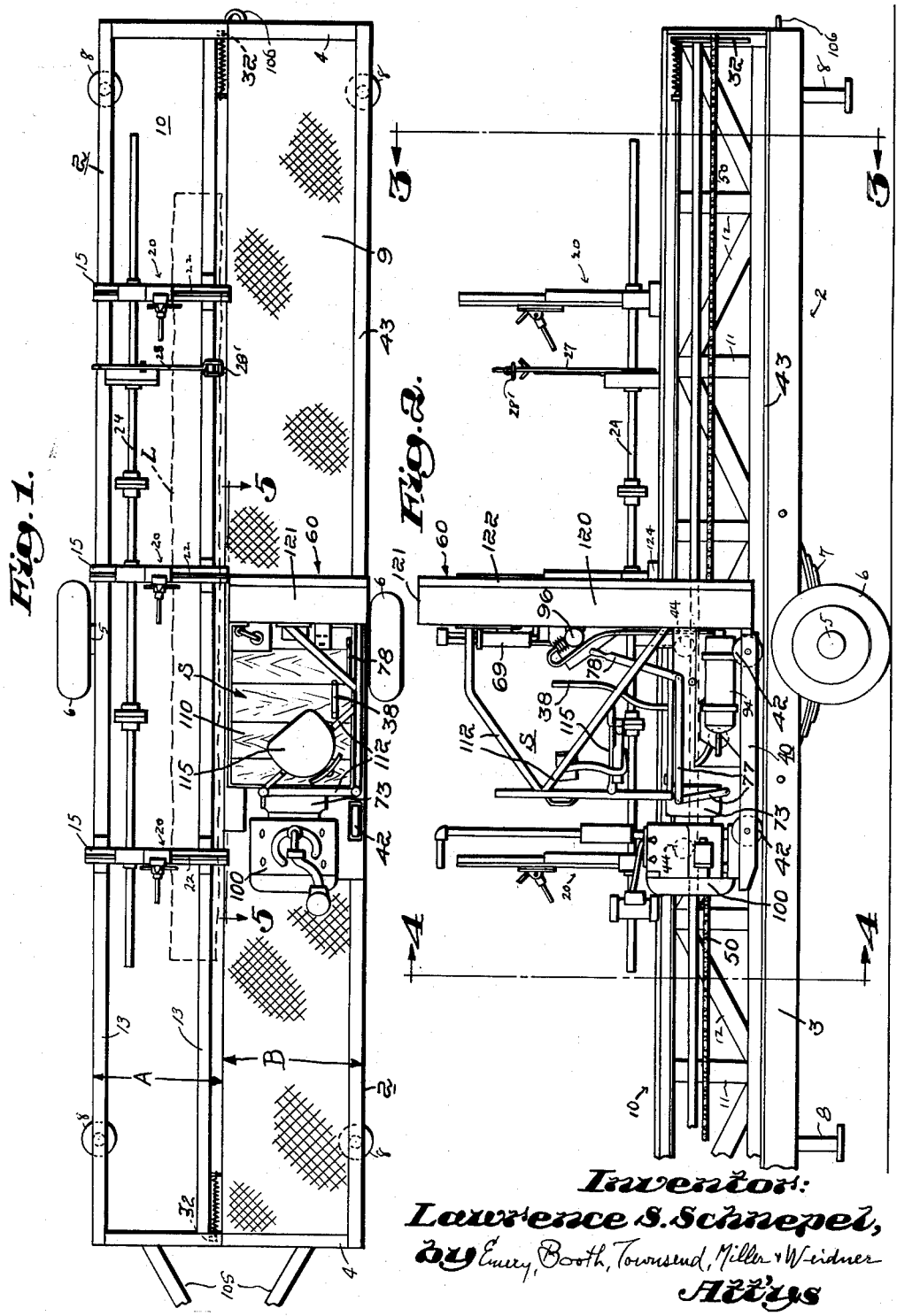

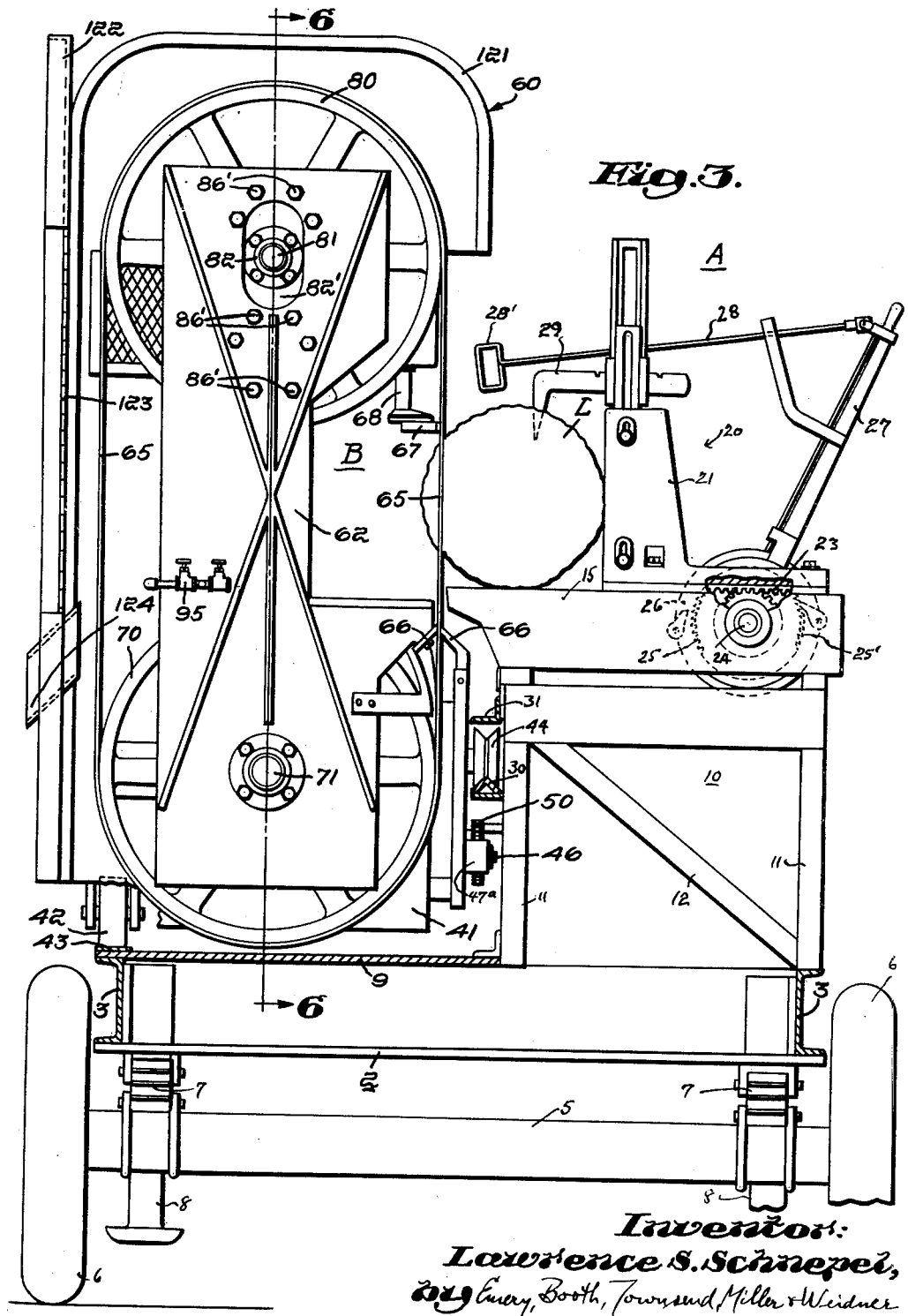

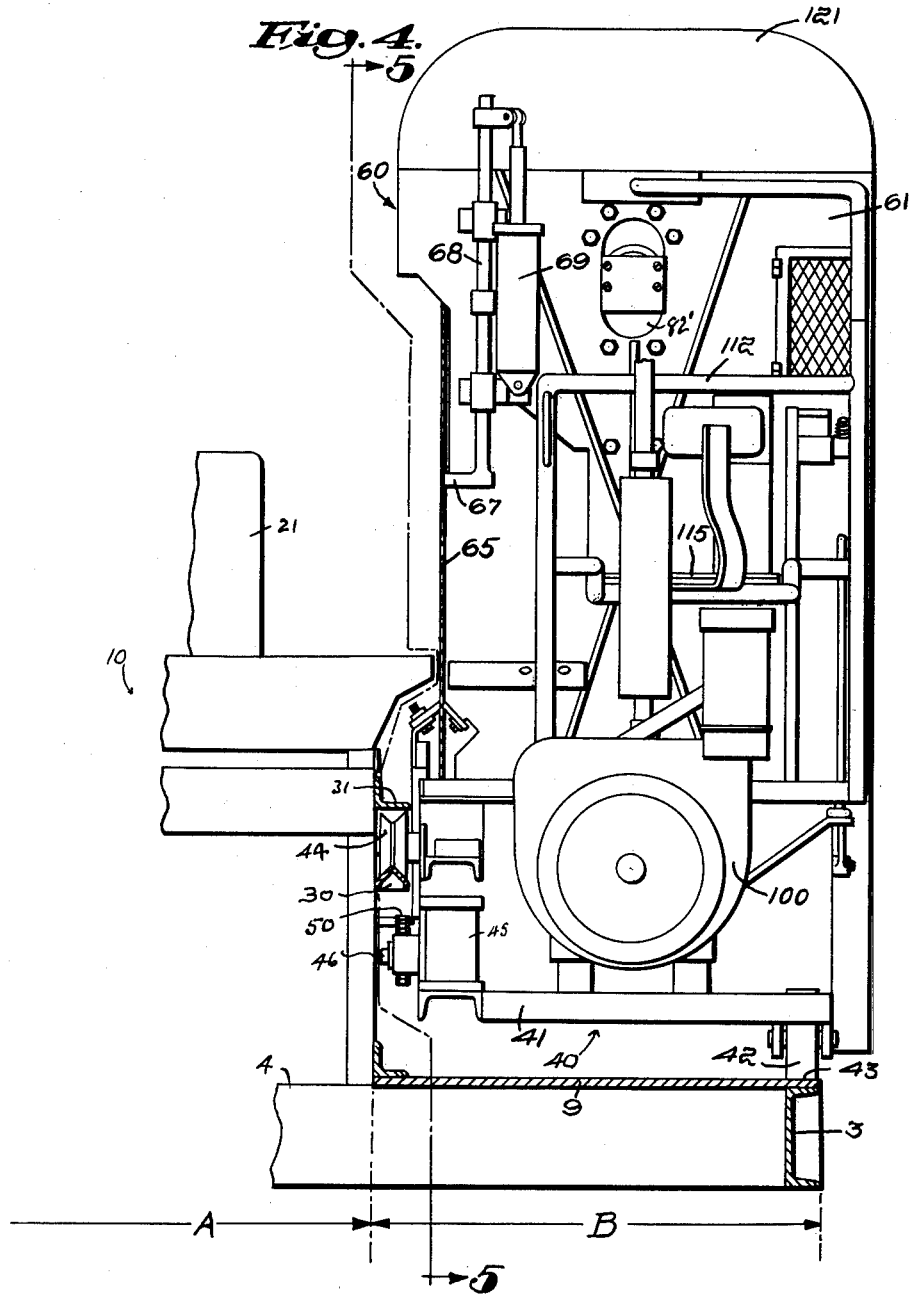

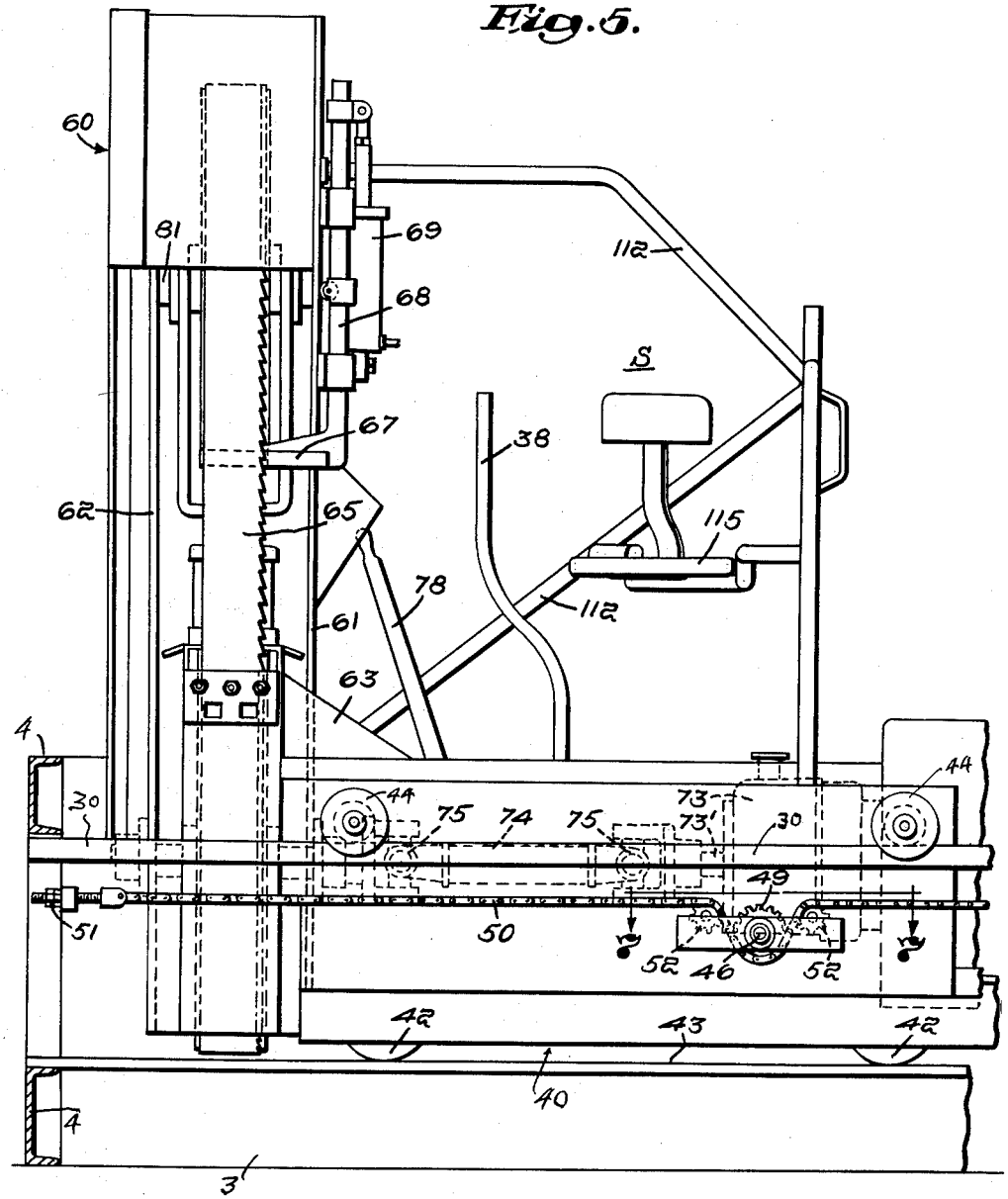

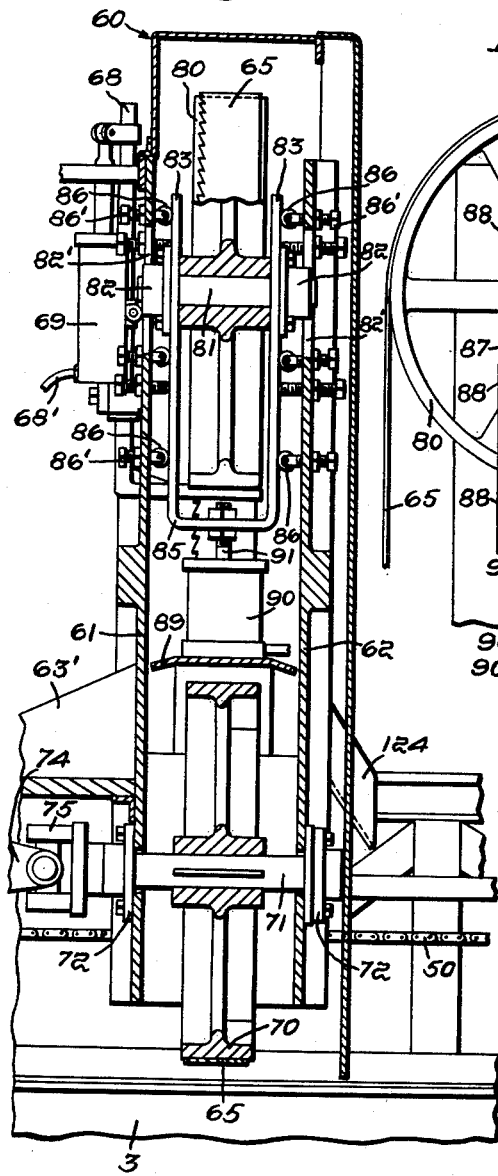
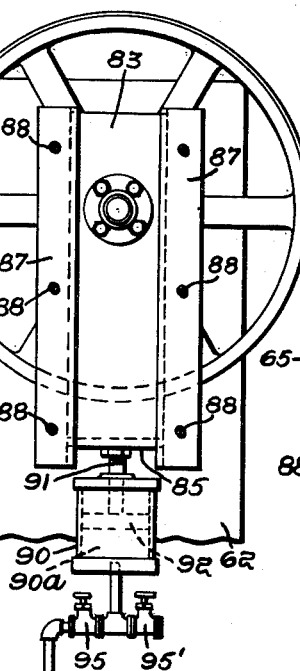
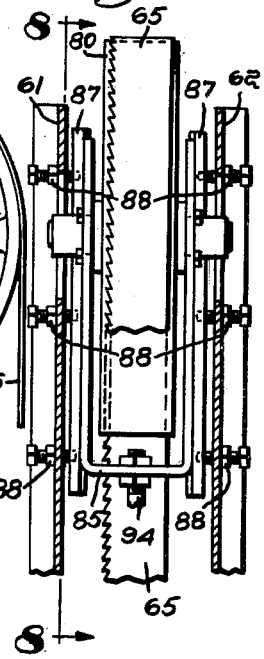

United States Patent Office 3,111,146
Patented Nov. 19, 1963

3,111,146
MOBILE SAWMILL UNIT
Lawrence S. Schnepel, Sunset Road, Cochituate, Mass.
Filed Nov. 12, 1959, Ser. No. 852,477
8 Claims. (Cl. 143—17)

This invention relates to wood sawing, and more particularly aims to provide a mobile sawmill as a machine unit which may be moved in the manner of a vehicle trailer into the woods in ready condition for sawing logs into boards by means of a band saw.

The invention resides in such mobile sawmill unit together with various improved operating characteristics, mounting and control for the band saw thereof including means providing automatic tensioning or strain control thereof.

In the illustrative embodiment of the invention specifically disclosed herein, a band saw disposed in a vertical plane is mounted on a hydraulically operated carriage for bodily travel lengthwise along the logs held on a stationary table of the sawmill. By reason of the pneumatic or fluid-controlled automatic tensioning means associated with the band saw mount and drive construction, the band saw may be operated effectively at high speed and without danger of breakage of the relatively expensive saw blade. The hydraulic actuating means for the carriage provides accurate control of the speed thereof with infinite capacity for speed variation in moving the saw blade longitudinally of the log.

By the present invention, the mill operator is enabled to saw the logs into boards in the woods, for example as at the locations of the usual truck loading platforms, and to move the unitary machine successively to places where the logs have been accumulated. The invention thus makes possible the much less expensive and more convenient operation of transporting boards rather than logs directly from the woods, together with other operating economies attendant on the novel sawmill structure of the present invention and whereby the sawing of the logs into boards, whether at the timber site or elsewhere, may be carried out in a convenient and efficient manner.

In the drawings showing an illustrative embodiment of the invention:

FIG. 1 is a top plan view of the mobile sawmill;

FIG. 2 is a side elevation of the sawmill, with the leveler jacks disengaged as for road travel;

FIG. 3 is an end elevation, partly in section as on line 3—3 of FIG. 2, showing a log positioned for a sawing operation;

FIG. 4 is an opposite end elevation of the saw carriage and power plant portion of the mill, partly in section as on line 4—4 of FIG. 2;

FIG. 5 is a view mainly in side elevation showing said carriage and the sprocket and chain means for traversing it along guideways therefor on the sawmill looking from the opposite side of the mill to that of FIG. 2, the vertical plane of the view being indicated by line 5—5 of FIG. 4 and also on FIG. 1;

FIG. 6 is a vertical transverse section through the band saw assembly at the plane of the saw pulley centers, as on line 6—6 of FIG. 3;

FIG. 7 is a horizontal detail section taken on line 7—7 of FIG. 5 showing the drive-applying portion of the hydraulic means for driving the carriage;

FIG. 8 is a fragmentary and partly diagrammatic end elevation taken as if on line 8—8 of FIG. 9 and illustrating the automatic band saw tensioning system;

FIG. 9 is a similar fragmentary vertical section of the upper pulley construction shown in FIG. 8, taken transversely of the saw mill, as if looking from the left at FIG. 8, corresponding to the central upper portion of FIG. 6, FIGS. 8 and 9 showing a modified guide provision for the pulley mounting head or supporting yoke;

FIG. 10 is a partly schematic side elevational view illustrating the hydraulic drive system for actuating and controlling the carriage and showing the control valve for regulating all aspects of said movement; and FIG. 11 is a similar view showing the control valve shifted by the sawyer for travel of the carriage in the opposite direction from that of FIG. 10.

Referring to the drawings in more detail, and first generally to FIGS. 1 to 3, in the illustrated sawing machine or mill, a rigid frame designated generally at 2 extends lengthwise of the machine. Such frame 2 comprises longitudinal channel members 3, 3 and a series of cross members 4, 4 distributed along and firmly united preferably by welding with the longitudinal members to provide the accurately aligned frame 2 by and with respect to which the alignment of all the main operational parts to be described is determined. For clear overall showing and to avoid repetition only the outer or end cross members 4, 4 appear on FIG. 1, it being understood that similar cross members together with diagonal struts are provided as appropriate for assured rigidity. For mobile road transportation purposes, the frame 2 is mounted on one or more transverse axles as at 5 provided with automotive-type wheels equipped with pneumatic tires 6, 6, supporting springs 7 being disposed between the frame and axle. Attached individually adjustable jacks of any preferred type are provided at least at the four corner areas of the frame 2, as conventionally shown at 8, 8, etc., to enable the machine to be anchored and adjusted to level position on uneven terrain.

The described frame 2 provides the supportive working and transporting base for the sawmill unit as a whole. One longitudinal section or area along the frame, of about half the frame width, as at the upper portion of FIG. 1 and at the right in FIG. 3, designated at A, provides the log-handling portion of the machine, presenting a stationary log-holding table 10. The other longitudinal area, marked B, provides a path of travel lengthwise the log for the riding carriage designated generally at 40. On this carriage 40 are mounted the entire band saw assembly, the power plant for the saw and for propulsion of the carriage, the operating controls, instrument panel and all essential gauges together with the sawyer's station at which he is enabled to ride comfortably seated.

Considering first the log-handling section A of the complete self-contained machine unit, the mentioned table 10 is substantially coextensive with the machine frame 2. The latter may be variously dimensioned according to the elected maximum capacity for the given sawmill. For example, for a 12' log length capacity, the machine frame length need not be more than approximately 20' overall, while for a 20' log capacity an overall machine frame length of about 30' suffices. The compactness of the unit machine widthwise is equally pronounced, frame widths of about 6' to 7' having been employed for machines of the capacities of the above examples, with the log table and the associated band saw to be described adapted to handle logs up to as much as 33" diameter, with the larger machine units for special requirements accepting logs of still larger diameter. The overall width of the machine including road wheels is well within pertinent existing highway regulations.

The log table 10 as illustrated comprises a series of angle-member uprights 11 arranged in opposed pairs crosswise the table and the machine and distributed lengthwise thereof with interconnecting transverse, longitudinal and diagonal structural members 12 all firmly united preferably by welding into a rectangular elongate table structure generally as shown. The top level of the table 10 is defined by longitudinal girders 13, 13 on which are supported the plurality of log-seating cross beams 15, three of which are shown in FIG. 1, with capacity for adjustment along the table as desired for runs of logs of different average lengths. These seating beams 15 together with the head blocks thereon designated generally at 20, see also FIG. 3, constitute the seats at which a log L to be sawed into boards, beams or other long form of lumber is presented and held fixed for longitudinal cutting by the traveling band saw 65 to be described.

The head blocks designated generally at 20 and the mounting and controls therefor may be of known or preferred form, such for example as employed on the usual longitudinally movable log carriage on the husk frame of conventional sawmills. The knees 21 of the blocks are shiftable in unison crosswise of the machine, being guided on ways 22, FIG. 1, along the log-seating beams 15, so as to receive the log and to adjust it by stepped increments toward the cutting plane of the saw 65 for sawing boards of desired thickness. Each knee 21 has along its base a toothed rack 23 meshing with a pinion fixed on a longitudinal shaft 24 journalled in and extending through the several log-seating beams 15. At one or more convenient points along it said shaft 24 is provided with means for manually turning it in one or the opposite direction, to, simultaneously advance or retract the several head blocks 20 accordingly. As shown in FIGS. 1 and 3 such means may comprise oppositely toothed circular ratchets 25, 25′ and cooperating pawl carriers 26 respectively fast and loose on the shaft. The loose element is adapted to be turned as by the hand lever 27, FIG. 3, located to be operable from the right side of the machine as viewed in said figure and having a lateral extension rod 28 with end grip 28′ accessible from the other side of the machine and convenient to the reach of the sawyer riding upon the saw carriage 40. Each head block 20 is equipped in the usual manner with one or more releasable vertically and laterally adjustable dogs 29 for holding engagement with the log L, as for example in FIG. 3.

Turning now to the longitudinal portion B of the machine, this area desirably has a grating, sheet metal or other floor 9, FIG. 1, set on and extending the length of the frame 2. The saw carriage 40 operates along and above the level of such floor 9. It comprises a dolly or platform 41 with supporting and guiding rollers including the lower outer rollers 42, 42 running on a planar track 43 on or closely paralleling the outer longitudinal channel member 3 of the machine frame 2 and a plurality of upper and inner V-grooved rollers 44, 44 riding on a like-shaped rail 30 fixed as by welding along the adjacent vertical side of the table 10; see FIGS. 3 to 5. Closely overlying said inner rollers 44 is an angle bar 31 also welded or otherwise secured in laterally projecting position along the table 10. This bar 31 serves as a captivator to keep the rollers 44 upon the rail 30 and also to cover them against accumulation of sawdust.

Noting FIGS. 3 and 4, the inner guide rail 30 and the contoured carriage rollers 44, 44 running upon it are in closely spaced lateral relation to the operating plane of the bandsaw blade 65 and also adjacently below the active cutting station at which the blade passes through the log L. This assures accurately guided parallelism for the traversing motion of the saw carriage and saw thereon with respect to the saw kerf lengthwise the log as in turn determined by the structurally unitary and weldingly united longitudinal elements of the machine frame 2 and log table 10 defining a single basic alignment and orientation for all operating motions and adjustments of the entire machine unit.

The dolly-like base or chassis 41 of the carriage 40 is supported by said outer and inner sets of longitudinally aligned rollers 42, 44 with adequate clearance above the floor 9 of the frame 2. It is generally rectangular in plan, see FIGS. 1 to 5, of a width conforming to that of the sawing section B of the machine and is relatively short compared to the machine length, being in the illustrated example but about one-fourth the latter.

For the purposes of description that end of the machine from or near which a log-sawing operation is begun, that at the right in FIGS. 1 and 2, will be termed the entering or start end, and the other the exit or stop end. Thus on FIGS. 1 and 2 the direction of travel of the carriage 40 in a cutting operation is from right to left (from left to right on FIG. 5 looking from the opposite machine side), with the return movement preparatory to making the next cut being from left to right on FIGS. 1 and 2. In the latter views the saw carriage 40 is at an intermediate position about central along its path of travel.

The carriage platform 41 has mounted at one end thereof, that toward the start end of the machine, near the right on FIGS. 1 and 2, the bandsaw head designated as a whole at 60, and has in balancing relation at the other end the self-contained power plant shown as a gasoline or other internal combustion engine 100, preferably air-cooled.

Traversing motion is herein imparted to the carriage 40 by a hydraulic motor 45, FIGS. 7, 10 and 11, mounted on an inner vertical side member 47 of the carriage and connected in a pressure fluid system energized from the engine 100 and carried in the entirety with the engine on the carriage 40. Such drive or feed system is of the servo type comprising a reservoir 33 for the oil or hydraulic fluid having conduit connection with one side of a pump 34 on or adjacent and driven from the engine or power source 100, the other side of the pump supplying the oil under pressure via a conduit 35 and through a four-way valve 36 therein to the hydraulic motor 45. The pressure fluid from said motor has return conduit connection as at 37 back through said valve 36 to the reservoir 33 in a closed system, as schematically diagrammed on FIGS. 10 and 11.

A speed and direction control lever 38 is operatively connected with the valve 36 and extends up to a position for convenient access by the sawyer; see FIGS. 2 and 5. From a comparison of FIGS. 10 and 11 it is apparent that with the control lever 38 in one position, as to the left on FIG. 10, the fluid pressure is admitted to the hydraulic motor 45 to rotate the shaft 46 thereof in one direction, counterclockwise on FIG. 10 as indicated by the arrow, while shifting of the lever to the opposite position of FIG. 11 admits the fluid to the other side of the motor for rotation thereof in the clockwise direction. The four-way valve 36 is of the reducing or controlled flow-rate type such as a spool valve wherein the internal ports are infinitely variable as to active orifice size, under operation of the control lever, so that the driving speed of the motor 45 is correspondingly variable by increments of any desired size.

From the hydraulic motor 45 the power drive for the carriage 40 with the saw head, power plant and all operating mechanism thereon is applied through a drive sprocket 49 fixed on the motor shaft 46, the latter extending through and journaled on the carriage side member 47 and in a journal bracket 47a thereon; see FIG. 7, also FIGS. 3 to 5 and FIG. 2. This drive sprocket 49, disposed in a vertical plane adjacent and paralleling the log table 10, reacts against a stationary sprocket chain 50 extending along the front face of the log table and anchored thereto at the opposite ends, with provision at least at one end for adjustably tensioning or slacking the chain as at 51, FIG. 5. As seen in the latter view, noting also FIG. 7, the motor and drive sprocket shaft 46 is offset from, hereinbelow, the line of the stationary chain 50 and the latter is caused to wrap around the drive sprocket 49 over an arc of desirably at least about 180°, as effected by a pair of idler sprockets 52, 52 rotatably mounted on the carriage wall 47, one at each side of the drive sprocket 49 and in like closely spaced relation thereto. The stationary chain 50 lies over and is supported by said idlers 52, 52 and between them loops down around the drive sprocket 49. With the exception of the fixed chain 50 the described carriage traversing mechanism is on and an element of the carriage assembly. It is simple and compact, with the sprocket 49 driven directly by the hydraulic motor 45 being the sole drive transmitting part. Accordingly this drive sub-assembly adds little to the total traveling weight of the carriage 40.

By reason of the positive drive as provided by the drive sprocket 49 and stationary chain 50 the carriage 40 is automatically confined within its limits of travel. In the usual course of the sawing operations the supporting guide rollers 42, 44 need seldom move to either extremity of the tracks 43 and 30. As a precaution in emergencies buffer means may be provided at the respective ends of the tracks. On FIG. 2 there is shown for this purpose an upright arm 32 pivoted on a fixed part of the log table 10 opposite the end of the upper track or rail 30 and heavily spring-loaded with capacity to move outward lengthwise the machine frame if abutted by a carriage roller 44, thereby to absorb any carriage overrun and prevent derailing.

Turning now to the sawing tool proper or bandsaw mechanism, this comprises the sawing head previously mentioned and designated as a whole at 60. This unit includes a pair of reinforced uprights or pillar plates 61, 62 on and between which the vertically spaced lower and upper bandsaw pulleys or wheels 70 and 80 are operatively mounted. These uprights 61, 62 extend crosswise of the saw carriage 40, and are relatively closely spaced in accurately parallel vertical planes. The operating space between them for the endless bandsaw blade 65 which is drivingly carried upon and passes around the wheels 70, 80 is held to a minimum for blades of a maximum width for the given machine. As best seen in FIG. 6, noting also FIGS. 3 and 5, the saw wheels 70, 80 and associated supporting and control mechanism to be described are in effect sandwiched in between the two uprights 61, 62 in an inboard fashion. The respective wheel shafts 71, 81 are confined in the axial direction substantially to the width of the space between the uprights. Thus in the interest of compactness and weight-saving there is a minimum of projecting heavy parts external to the uprights, such as counterweighting portions of shafts as found in the generality of prior bandsaw head constructions.

The two uprights 61, 62 are rigidly secured together as a support unit and in the described closely spaced relation lengthwise of the machine. The upright 61 which is nearer the engine end of the carriage 40 is anchored on and united to the carriage as by welding at its lower portion on the carriage platform 41 with appropriate reinforcement and bracing as for example at 63, FIG. 5, and 63′, FIG. 6. The opposite upright 62, nearer the cut start end of the machine, toward the right on FIGS. 2 and 6, is supported on and by the first upright 61 by means of welded or other rigidly connected cross members at the medial region of the upright 62, in the space between the lower and upper bandsaw wheels 70, 80. This outer support plate 62 has an overall vertical and lateral size less than the area defined by and within the endless bandsaw blade 65, with the upper and lower ends terminating respectively below and above the top and the bottom of the wheels 70, 80. Thus access to the bandsaw wheels is provided, in the axial direction, for installing the endless band 65 of the saw on or removing it from the wheels 70, 80.

The shaft 71 of the lower and herein driven wheel 70, and on which said wheel is made fast, is journaled in bearings 72, 72, preferably of an anti-friction type such as cartridge ball bearings, on the respective uprights 61, 62, and aligned lengthwise the machine. It is directly driven from the engine 100 on the carriage 40 through drive connections with the engine shaft including a clutch and reduction gearing in a transmission case on the engine as at 73, FIGS. 1, 2 and 5. A drive shaft element 74 preferably with universal joints 75, 75 at each end is connected respectively to the output shaft of the transmission 73 and to the inner end of the lower wheel shaft 71; see particularly FIG. 6, also FIG. 5. Control of the clutch, to apply or to release power from the engine, is provided through linkage 77, FIG. 2, extending from the usual clutch actuator to a clutch control lever 78 extended upwardly conveniently to the hand of the sawyer at his station on the carriage, see also FIG. 5.

In accordance with the invention the upper bandsaw wheel 80 is yieldably mounted and provided with automatic strain-control or tensioning means. As best seen in FIGS. 6, 8 and 9, also FIG. 5, the relatively short horizontal shaft 81 of this upper wheel 80 is journalled in aligned bearings 82, 82, preferably of a roller type, mounted on the axially spaced and upwardly extending legs 83, 83 of a U-shaped yoke 85 located centrally between the uprights 61, 62 of the saw head 60. This wheel-carrying yoke is itself pneumatically yieldably supported and in effect floated, with capacity to move vertically in either direction. This is accomplished through the medium of a pneumatic system to be described.

In such vertical movement, for tensioning or relieving the saw band 65, the yoke 85 is guided by low friction guide means of which alternative forms are shown. On FIG. 6 vertical series of guide rollers 86 are rotatably mounted at the inner ends of studs 86′ adjustably threaded through the uprights 61, 62 at the respective sides of the yoke 85. These rollers engage and vertically guide the yoke 85 at the outer vertical faces of the respective legs 83, 83 thereof, the latter having grooved or other tracks for guided alignment of the vertical roller series. Alternatively, FIGS. 8 and 9, the vertical margins of the legs 83, 83 of the yoke 85 may be disposed to slide directly in guideways 87, 87 in turn adjustably secured as by threaded studs 88 at the respective adjoining uprights 61, 62. As seen on FIG. 3, also FIG. 6, the uprights 61, 62 are formed each with a vertical elongated through opening 82′ into or through which the wheel shaft bearings 82 extend, thus permitting the desired vertical movement for the upper wheel 80 and affording further guidance and limiting stops therefor.

The above described vertically movable mount for the upper bandsaw wheel 80 forms a part of the automatic strain control means for the bandsaw 65, which means further comprises a pneumatic system as mentioned. Noting particularly FIG. 8, also FIGS. 2, 6 and 9, there is mounted in stationary position on a rigid fixed part of the saw head 60, as on the cross member 89, FIG. 6, an hermetically sealed air chamber 90. A plunger 91 extends slidably through the top of this air chamber, with suitable packing thereat, and is connected at the upper end to the bottom cross-member of the U-yoke 85. The other end of the plunger 91 within the air chamber 90 is carried on a movable wall 92, such as a piston or diaphragm providing below it in the chamber a pressure-sealed compartment 90a. The latter is connected by a conduit 93 suitable for expansible fluid under pressure, such as compressed air, and extending between the air chamber 90 and an expansion tank 94 provided with a pressure gauge 94′. Manual control valves 95, 95′ are connected into an intermediate portion of the conduit line 93. The valve 95, that at the left on FIG. 8, see also FIG. 3, is adapted to open or to close the compressed air line between the expansion tank 94 and the chamber 90. The other valve 95′, at the right in FIG. 8, is adapted to vent to atmosphere the air pressure from the compartment 90a, upon closing off of the first valve 95, when it is desired for any reason to slacken or relieve strain from the saw band 65, as for inspecting or replacing it.

Air under pressure is supplied at the expansion tank 94 as by means of an air compressor 96 driven from a power source on the carriage and connected by a conduit 97 to the tank. This entire compressed air assembly is compactly installed in out-of-the-way position on the saw carriage 40, the expansion tank 94 as seen in FIG. 2 being conveniently stowed on the carriage platform 41 adjacent the bandsaw head 60, with the wheel-controlling air chamber 90 centrally mounted on the bandsaw head as described. As shown the small electric motor of the compressor 96 is powered from the storage battery of the engine 100 and is conveniently located as on or adjacent the instrument panel at the sawyer's station, as also the pressure gauge 94'. In this regard see FIG. 2, it being noted that on FIG. 8 the several described elements of the pneumatic system are represented somewhat schematically. Alternatively the compressor 96 may be hydraulically operated from the engine 100 as by pump 34 or another oil pump driven by the engine, which pump or pumps also may be utilized for supplying controllable power for the operation of feed rolls when employing the saw head as a band resaw or for actuating other accessory equipment.

In operation, air pressure from the compressor 96 and expansion tank 94 is supplied below the piston or diaphragm 92 of the air chamber 90, urging the plunger 91 upwardly and with it the wheel-carrier yoke 85 and the upper bandsaw wheel 80. The desired degree of strain or tension is thus applied to the bandsaw blade 65 for accurately aligned cutting lengthwise the logs. The area of the piston 92 and volume of the pressure compartment 90a of the air chamber 90 are relatively small as compared to those of the expansion tank 94, being so relatively proportioned that pressure is applied to or relieved from the wheel yoke 85 at a calculated rate which is a large multiple of that for corresponding volume and pressure change at the expansion tank 94. Thus the plunger 91 and wheel yoke 85 thereon have capacity for vertical movement of substantial extent with but slight attendant pressure change at the expansion tank 94, by reason of the relatively large volume of the latter as compared to that of the pressure compartment 90a of the air chamber 90.

In the course of sawing operations, if an obstruction such as a knot or a branch stub comes between the sawblade 65 and one of the wheels 70 or 80 in such a fashion as would ordinarily increase the tension of or impose excess strain on the saw blade and impart likelihood of saw breakage, such increased tension is instantly counteracted and compensated for by appropriate corrective reaction within the pneumatic chamber 90 and associated expansion system which enables the otherwise excess pressure to be dispersed to the expansion tank 94. Thus such increased tension on the saw blade 65 causes the upper wheel 80 to move downwardly against the air pressure in the system, thereby preventing saw breakage by undue and sudden increase in the strain thereof. Upon clearance of the obstruction from between the blade and the wheel the normal operating tension is immediately and automatically restored by return of pressure from the expansion tank 94 where the pressure level is maintained by the compressor and the preset automatic gauging control thereof.

The customary or preferred guides adjacent the active sawing location are provided, to maintain the bandsaw blade 65 in proper position relative to a log being sawed. As seen in FIGS. 3, 4 and 5, these include a lower saw guide comprising a pair of plates 66, 66 fixed on the carriage and extending angularly upwardly towards the saw blade on opposite sides thereof, the upper ends of the plates being spaced for guided passage of the saw blade 65 between them. The saw guide means further includes an upper guide shoe 67 which is movable vertically to appropriate position closely about the kerf being cut in the work log or timber. This upper saw guide 67 is carried on a vertical movable post 68 guided on the upright 61 of the saw head and actuable vertically by hydraulic cylinder means 69 having a control valve at the disposal of the operator. Pressure fluid for operation of this upper saw guide 67 may be separately supplied from the mentioned pump of the hydraulic carriage traversing system, as through a conduit 68, FIG. 6.

From the foregoing in connection with the drawings it will be apparent that a supervising and control station for the sawyer is provided on the saw carriage 40 as at the location designated S, FIGS. 2 and 5. At this area between the saw head 60 and the power supplying engine 100 a wooden or other floor 110 is installed on the carriage 40 at a level spaced conveniently above that of the main supporting platform 41 thereof, see FIGS. 2 and 5. Such sawyer's station S may be marked off as by tubular railing 112 which further provides support for a seat 115 for the sawyer, at which he is enabled to view and control the various operations while riding with the saw. As previously noted the engine clutch lever 78 and the carriage traverse control lever 38 stand conveniently accessible at this sawyer's station S as likewise the several instruments and gauges associated with the described engine or power plant 100 and with the hydraulic traversing system associated with the carriage motor 45, the hydraulic control 69 for the upper saw guide 67 and the pneumatic system of the automatic bandsaw blade straining means correlated with the upper wheel yoke 85.

Desirably the saw head 60 is provided with substantially complete enclosure save only at the active working vertical medial portion of the bandsaw 65 where it engages the log. Such enclosure as illustrated comprises lightweight sheet metal walls of which the main wall facing the sawyer's station S includes the vertical upright 61 of the pair thereof previously described. Connected at the outer vertical edge of said wall, at the side away from the log table 10, that nearer the viewer in FIG. 2 and at the left on FIG. 3, is a casing wall 120 secured also at its lower end to the carriage platform 41 and at its upper end merging into an inverted cup-shaped cover 121. Said lateral enclousre wall 120, FIG. 2, is of a width, in the direction lengthwise the machine frame and axially of the bandsaw wheels 70, 80 to span the entire saw head unit 60. At the vertical edge of the enclosure side wall 120 toward the cut start end of the machine frame, i.e. toward the right on FIGS. 1 and 2, the saw head enclosure is completed by a conforming panel desirably arranged as a door 122 with piano-type hinge connection as at 123, FIG. 3. In said view the door 122 is shown swung open, being turned 90° outwardly, toward the left, from its normal closing position widthwise of the saw head and of the machine. The door may be provided at a location adjacently below the sawing line of the bandsaw with a sawdust directing chute 124.

The sawmill unit or machine as a whole is provided at one or both ends of the frame with standard or other trailer hitch means for connection with a car, truck or tractor for highway towing. At the left in FIG. 1 attaching draw bars of such hitch are indicated at 105. The opposite frame end may be similarly equipped or otherwise provided with a hook-up element such as the connector eye 106, FIGS. 1 and 2.

As herein disclosed the invention provides a sturdy and compact mobile sawing machine which is towable as a complete unit at highway speeds. For example, the overall weight of the entire machine unit for one average size mill of the invention is but approximately 8600 lbs., which mill has a capacity up to 1000 board feet per hour.

It will be noted that while the logs to be sawed may vary widely both in diameter and length and hence in weight, the moving carriage 40 of this invention at all times presents a uniform weight of equipment. Hence the load on the engine or power source 100 is substantially constant. This is of great advantage over conventional sawmills wherein logs of widely varying weight have to be moved relative to a stationary saw.

Numerous further advantages resultant from the simplified unitary sawmill structure of the invention are apparent. The disclosed unit construction minimizes upkeep and depreciation expense. The set-up time at any selected location is minutes instead of days. The compact machine unit occupies generally fifty percent less space than conventional sawmills. The operating mechanism of the machine dispenses with belts or cables and hence with the constant attention usually needed for such. It will be apparent also that the mill if desired may employ a two-way cutting bandsaw blade toothed along both edges in known manner. In such instance the machine produces a kerf along the stationary log or timber in the course of either and both directions of travel of the saw.

Still further, through the disclosed special adaptation of a road mobile bandsaw to log-sawing operations a much narrower kerf is cut, resulting in about sixty percent less sawdust than with circular sawmills and affording about fifteen percent greater yield of lumber. The number of persons required in the labor crew is importantly reduced. For example in addition to the sawyer who rides the saw carriage with all controls at his disposal, but two helpers are needed, one to feed logs onto the stationary table and the other to remove the sawed lumber. The bandsaw of the machine is easily replaced in a matter of minutes, eliminating much shut-down time as ordinarily required for resharpening of saws.

Along with these numerous advantages there is the primary benefit of elimination of the costly hauling of logs from the forest to the mill. Under this invention the lumberman is enabled to haul out of the woods neatly stacked finished lumber instead of bulky logs.

My invention is not limited to the particular embodiment thereof illustrated and described herein, and I set forth its scope in my following claims:

1. In a mobile sawmill, in combination, an elongate horizontal base frame proportioned and adapted for towed travel as a trailer on public highways, said frame comprising flanged structural steel longitudinal and transverse members terminally interfitted and welded and having inboard thereof lengthwise along one side a similarly constructed stationary log-holding table and along the other side a saw carriage trackway, a saw carriage movable along the trackway, said carriage comprising a generally rectangular steel frame of but approximately half the width of the sawmill base frame and having at a level adjacently above said base frame a platform carrying at one end a bandsaw head and in balancing relation at the other end a self-contained power plant with a sawyer's station between them, said carriage trackway having a length for movement of the bandsaw head by the carriage between positions beyond the opposite ends of logs of maximum length for the given sawmill, said bandsaw head comprising a vertical frame comprising upright pillar plates extending in parallelism transversely of the carriage and closely spaced in the direction of carriage travel for confining between them correspondingly short upper and lower shafts for supporting driving and driven pulleys for a bandsaw thereon, a direct aligned drive shaft operatively connecting the power plant and the driving saw pulley, hydraulic traversing drive means for and on the carriage and pressure energized from said power plant independently of the bandsaw drive, and control valve means and an operating member therefor accessible to a sawyer riding at said station of the carriage whereby to order travel of the carriage in either direction at will and at rates variable by any desired increments.

2. A mobile sawmill comprising in combination an elongate base frame, a stationary longitudinal table thereon arranged to present a log to be sawed lengthwise, a sprocket chain extending along the table and anchored with respect to the frame at the chain ends, a carriage disposed for traversing along the frame and log table, a sprocket on the carriage drivingly engaging the sprocket chain, an engine on the carriage, a hydraulic motor on the carriage in operative relation to said sprocket wheel whereby to drive said carriage in either direction, means for manually controlling the speed and direction of said hydraulic motor, a pair of spaced bandsaw pulley wheels mounted in a vertical plane on said carriage, a bandsaw blade running about said pulley wheels, drive connections between the engine and the lower wheel, the upper of said wheels having a vertical movable support, yieldable fluid cushioning means connected to position said upper wheel support, and expansion chamber means affording automatic yielding and return movement of said upper wheel support in the event of tension-increasing obstruction between the saw blade and a wheel.

3. In a sawmill according to claim 2, the construction wherein the yieldable fluid cushioning means comprises a pressure-sealed cylinder disposed beneath the upper wheel support and containing a movable wall member defining a pressure compartment, a rigid connection between said wall and said upper wheel support, and the expansion chamber means comprises an expansion tank having conduit connection to said pressure compartment, and means for supplying compressible pressure fluid such as compressed air to the expansion chamber and from it to said pressure compartment to support said yoke and said upper wheel in relative vertical position for placing a bandsaw disposed around the two wheels under desired predetermined operating tension subject to automatic self-adjustment by reverse pressure fluid transfer to the expansion tank in the event of excess tension.

4. A mobile bandsaw mill constructed and arranged as a machine unit and comprising, in combination, an elongate base frame presenting a stationary log table and a paralleling operational trackway, said table and trackway disposed within the lateral confines of the base frame and being each of approximately half the frame width, a vertical bandsaw head and an engine on the carrier with a sawyer's riding station between them having capacity for seating of the sawyer, an hydraulic rotary drive on the carriage powered from the engine thereof and drivingly engaged with means fixed along the frame generally centrally thereof to move the carriage in one and the opposite longitudinal directions, control means for said hydraulic device operatively independent of the powering engine and accessible at the sawyer's station to order and regulate the direction and speed of the carriage movement, said base frame and log table comprising longitudinal, transverse and intermedial metal structural elements of angle bar and strip form of minimal weight and all accurately oriented, aligned and weldingly joined into a compact structural unit.

5. A mobile bandsaw mill constructed and arranged as a machine unit and comprising, in combination, an elongate base frame presenting a stationary log table and a paralleling operational trackway, a vertical bandsaw head and an engine on the carriage with a sawyer's riding station between them, an hydraulic rotary drive on the carriage powered from the engine thereof and drivingly engaged with means fixed along the frame to move the carriage in one and the opposite longitudinal directions, control means for said hydraulic device independent of the powering engine and accessible at the sawyer's station to order and regulate the direction and speed of the carriage movement, and an overall enclosure for the bandsaw head on said carriage, save for the active cutting portion of the saw blade, such enclosure including a first transverse upright wall partitioning the saw blade from the sawyer's station, an outer vertical side wall at the side away from the cutting side, a top cover on said transverse and side walls, and a second transverse wall paralleling and spaced from said first wall sufficiently to house the bandsaw between them and openable for access to the saw.

6. A bandsaw and saw-actuating equipment carriage for a mobile sawmill comprising a generally rectangular platform with inner and outer longitudinal sides and leading and trailing transverse ends with respect to the direction of kerf formation, a bandsaw head on and adjacent the trailing end of the carriage, an engine in general balancing relation adjacent the leading end of the carriage, a sawyer's station on the carriage between the bandsaw head and the engine, carriage traversing and bandsaw driving equipment on the carriage with controls therefor at the sawyer's station, said carriage equipped with supporting and guiding roller means adapting it for traversing along an elongate frame of a sawmill, said roller means including a longitudinally aligned series of lower rollers below the carriage along one longitudinal side and an upper series of aligned rollers along the opposite longitudinal side and disposed at a level closely adjacently below the active cutting portion of the bandsaw blade, said upper rollers being peripherally contoured for accurate aligned tracking along a like-contoured rail fixed along the sawmill frame.

7. A bandsaw and saw-actuating equipment carriage according to claim 6 wherein the carriage traversing and bandsaw driving equipment on the carriage includes a hydraulic carriage drive system powered from the engine, a pneumatic system for automatically yieldably tensioning the blade of the bandsaw head and supplied with fluid pressure by a compressor driven from a power source on the carriage.

8. The structure for a mobile sawmill according to claim 6 wherein the bandsaw head comprises a pair of parallel steel plate uprights with basal support for one of them, the other being medially supported from said one upright and proportioned for installation of the endless band of a saw laterally about it and into the vertical space between the upright pair, vertically spaced lower and upper wheels for reception of the bandsaw about them, the lower wheel on a shaft fixedly journalled on and between the uprights and adapted for driving from a power source, a vertically movable yoke between the uprights and having the upper wheel journalled thereon, guide means for the yoke on the uprights, and a pressure fluid system acting to support the yoke in yieldably upwardly lifting position thrusting the upper wheel toward the bandsaw passing over it to impose selected tensioning strain thereon for the sawing operation, said system including a single relatively small pressure-fluid cylinder with piston therein connected to said wheel-journalling yoke and automatic fluid pressure control means including a relatively large volume expansion chamber connected with said cylinder and acting in response to forces tending to increase the saw tensioning in the saw operation including sudden large forces as characterized by entry of knots or other hardnesses between the bandsaw and a pulley and whereby to maintain the selected tensioning strain upon the bandsaw substantially constant.

References Cited in the file of this patent

UNITED STATES PATENTS

| | | |
|---|---|---|
| 402,490 | Taylor | Apr. 30, 1889 |
| 549,557 | Wilkin | Nov. 12, 1895 |
| 579,382 | Coleman | Mar. 23, 1897 |
| 616,219 | Wilkin | Dec. 20, 1898 |
| 770,136 | Wilkin | Sept. 13, 1904 |
| 1,169,807 | Hansen | Feb. 1, 1916 |
| 1,242,033 | Painter | Oct. 2, 1917 |
| 1,590,105 | Martin | June 22, 1926 |
| 1,842,114 | Pratt | Jan. 19, 1932 |
| 2,205,632 | Schwartz et al. | June 25, 1940 |
| 2,427,038 | Ashman | Sept. 9, 1947 |
| 2,492,824 | Ahrndt | Dec. 27, 1949 |
| 2,612,913 | Bach | Oct. 7, 1952 |
| 2,664,118 | Krumbach | Dec. 29, 1953 |
| 2,863,397 | Billings | Dec. 9, 1958 |